United States Patent [19]
Middleton et al.

[11] Patent Number: 5,645,697
[45] Date of Patent: Jul. 8, 1997

[54] PREVENTING CONTAMINANT BUILD-UP IN BEER LINES

[76] Inventors: David Leslie Phillip Middleton, 19 Rosemont Ave. Broadbeach, Gold Coast, Australia, 4218; David Brian Telfer; Clive Barnes, both of 48/22 Jennifer Ave., Runaway Bay, Gold Coast, Australia, 4216

[21] Appl. No.: 406,866
[22] PCT Filed: Sep. 21, 1993
[86] PCT No.: PCT/AU93/00482
  § 371 Date: Mar. 23, 1995
  § 102(e) Date: Mar. 23, 1995
[87] PCT Pub. No.: WO94/07790
  PCT Pub. Date: Apr. 14, 1994

[30]  Foreign Application Priority Data

Sep. 25, 1992 [AU] Australia ................. PL4932

[51] Int. Cl.[6] ......................................... C12H 1/00
[52] U.S. Cl. .................... 204/155; 426/234; 426/237; 426/241
[58] Field of Search ................. 204/155; 426/234, 426/237, 241

[56]  References Cited

U.S. PATENT DOCUMENTS

| | | | |
|---|---|---|---|
| 339,541 | 4/1886 | Fraser | 204/155 |
| 1,162,212 | 11/1915 | Bloom | 204/155 |
| 3,625,843 | 12/1971 | Doevenspeck | 204/139 |
| 4,524,079 | 6/1985 | Hofmann | 426/234 |
| 5,102,515 | 4/1992 | Ibbott | 204/150 |

FOREIGN PATENT DOCUMENTS

| | | |
|---|---|---|
| 202537 | 12/1889 | France . |
| 63-316725 | 12/1988 | Japan . |
| 471318 | 9/1937 | United Kingdom . |
| 91/01183 | 2/1991 | WIPO . |

OTHER PUBLICATIONS

Derwent Abstract Accession No. A8729Y/05, Class P43, DL.A. 123060 (Christianasen) Nov. 20, 1976.

Derwent Abstract Accession No. K9353B/47, Class P43, SU.A. 649482 (Dumanskii) Apr. 6, 1977.

*Primary Examiner*—Arun S. Phasge
*Attorney, Agent, or Firm*—Jacobson, Price, Holman & Stern, PLLC

[57] ABSTRACT

Apparatus for preventing contaminant build-up in beer supply lines including a coil supported on a former located coaxially about the beer line. A signal generator is connected to the coil to apply a signal of varying frequency to the coil to prevent bacterial growth on the inside of the line.

18 Claims, 4 Drawing Sheets

PREVENTING CONTAMINANT BUILD-UP IN BEER LINES

TECHNICAL FIELD

This invention relates to a method and apparatus for preventing contaminant build-up in pipes, ducts or the like. In particular, the invention relates to a method and apparatus for prevent contaminant build-up in pipes or ducts which carry beer or other like alcoholic beverages.

BACKGROUND ART

Beer and related alcoholic beverages in draft form are usually conveyed in pipes or ducts from a supply, such as a keg to an outlet for dispensing purposes. Such arrangements are common in hotel and associated industries where beer is supplied in a pipeline conveyed to a tap located adjacent a bar. Ducts or pipes which carry such beverages tend to require regular cleaning because of bacteriological build-up within the pipes or ducts. This is normally a tedious task requiring disassembly of the pipelines and cleaning by passing a cleaning or flushing fluid therethrough. This also incurs a cost which is passed onto the consumer.

Particular bacteria which create spoilage problems in beer and related alcoholic products include:

| | |
|---|---|
| Serratia spp | Pseudomonas spp |
| Achromobactger spp | Acetobacter spp |
| Flavobacterium spp | Obesobacterium spp |
| Lactobacillus spp | Pediococcus spp |
| Leuconostoc spp | Aeromonas spp |

The Yeast spp include:

| | |
|---|---|
| Saccharromyces spp (wild types) | Schizosaccharromyces spp |
| Toropulis spp | Klueverkia spp |

Bacteria together with the blue-green algae and the Archaebacteria comprise the 'Procaryotes' (or Procaryotic organisms). Yeast, and plants and animals, comprise the 'Eucaryotes' (or Eucaryotic organisms).

Bacterial and yeast cells transfer nutrients across a cytoplasmic membrane which is the "selective permeability membrane" between the cell cytoplasm (interior) and the external environment. The supporting cell wall is somewhat porous and acts as a sieve only to exclude molecules larger than about one nanometer. Certain enzymes, and especially the electron transport chain, that are located in the membrane, are responsible for an elaborate active transport system which utilises the electrochemical potential of the proton to power it.

Growth for unicellular organisms implicitly includes the potential for asexual reproduction, or increase in cell numbers (or biomass). The determinants of microbial growth are described as consumable and environmental. Consumables represent the essential food, or nutritional requirements of cells. Conventionally they include sugars, starches, protein, vitamins, trace elements, oxygen, and carbon dioxide but bacteria are the ultimate omnivores, and substrates as diverse as plastic, rubber, kerosene and cement can be subject to microbial attack. Environmental determinate are those limiting growth factors, the main being pH, temperature and water availability. Most bacteria grow best between ph 7.4 to 7.6, however, the range is extreme form some species, and some exception bacteria can grow at pH 1–2, while others exist at pH 9–10.

The growth requirements outlined above express themselves as growth through the less tangible but fundamental necessity of energy transfer, which is provided by metabolism. Living cells need a system of energy storage and this is provided by chemical bond energy, strictly the free energy of hydrolysis of a diphosphate bond in the compound ATP—adenosine triphosphate. Energy yielding reactions and energy storage systems form a common pattern found in all living systems. A fundamental characteristic of these reactions is that they proceed via a series of steps each mediated by a separate enzyme. This ensures a gentle transfer of energy, not an explosive energy release.

The majority of bacterial and fungal cells do not colonise aqueous systems as free swimming entities but selectively colonise the water/surface interface layers. Thus they bind to these interface layers in a biofilm.

SUMMARY OF THE INVENTION

The present invention aims to provide a method of, and apparatus for preventing contaminant build-up in, or for removing contaminant from, pipes, ducts or other lines which carry beer or other related alcoholic beverages without the necessity of dismantling same or using a flushing fluid as the primary cleaning agent. The present invention further aims to provide an apparatus which may be simply fitted to existing pipelines or ducts at minimum cost. The present invention further aims to provide a method and apparatus which may be employed for cleaning the walls of existing pipes and ducts carrying beer or related alcoholic beverages. Other objects and advantages of the invention will become apparent from the following description.

The present invention thus provides a method for preventing or removing contaminant build-up in a pipe, duct or line carrying beer or other related alcoholic beverages, said method including the steps of applying an electro-magnetic field to a section of said pipe, duct or line, said electro-magnetic field having a frequency or range of frequencies such as to inhibit or remove contaminant cell growth on the walls of said duct or pipe.

The present invention also provides an apparatus for preventing or removing contaminant build-up in a pipe, duct or line carrying beer or related alcoholic products, said apparatus including a coil adapted to be disposed about a section of said pipe, duct or line and means for applying a signal to said coil to create an electro-magnetic field within said pipe, duct or line, said electro-magnetic field having a frequency or range of frequencies sufficient to inhibit or remove contaminant cell growth upon the walls of said pipe, duct or line.

It is believed that the applied electromagnetic field created in the pipe or duct carrying the beer interferes with the electron transport chain within the cell to thus inhibit uptake of nutrients, leading to cell stasis, or death.

Additionally, the electromagnetic field may block uptake of a key nutrients thus further inhibiting cell growth. The electromagnetic field may in addition alter the local pH at a key enzyme site to further limit bacteria growth. The electromagnetic field may furthermore affect a single enzyme reaction, or class of reactions thus promoting a lethal cascade type reaction within the cells. The electromagnetic field may additionally prevent the initial binding of the bacterial cells to the surface of the pipe or duct or may interfere with the complex molecular interactions or a mature biofilm.

A further effect of the electromagnetic field may be a physical effect of vibrating the pipe or duct to prevent bacterial and fungal cells attaching themselves to the inner surface of the pipe or duct or by causing the cells to become detached from the inner surface of the pipe or duct.

The coil for application of the electromagnetic field to the pipe or duct preferably is wound about a polyvinyl chloride (PVC) or other non-ferrous former which is located coaxially about the beer pipe or duct and adjacent to the beer keg to which the pipe or duct is attached. The beer pipe or duct is normally connected to the beer keg through an adaptor. Preferably, the former and coil assembly are located no greater than 10 cm. from the adaptor so that there is no excessive build-up of contaminants in the pipe or duct between the coil and keg.

An AC voltage is applied to the coil to generate an electro-magnetic field which radiates into the beer carrying pipe or duct and the beer flowing therein. The frequency of the voltage applied to the coil most preferably varies to sweep a range of frequencies with the most preferable range being 1 KHz to 7 KHz. Preferably the voltage signal applied to the coil has an average frequency which preferably is in the range of 1.2 to 2.6 KHz. The voltage applied to the coil is preferably 5 volts AC.

The signal applied to the coil most preferably has the form of a positive going square wave followed a negative going spike having a variable frequency.

The signal generating means suitably comprises first and second square wave oscillators, and the output of the second oscillator is modulated in frequency by the output of the first oscillator. The signal generating means also suitably includes a third square wave oscillator, and the output of the second oscillator is used to frequency modulate the output of the third square wave oscillator.

Amplifier means are preferably employed for amplifying the output of the third square wave oscillator. The output of the amplifier means is adapted to be connected to the coil via capacitance means to define the required form of the signal which as stated above preferably comprises a positive going square wave followed by a negative going pulse.

BRIEF DESCRIPTION OF THE DRAWINGS

In order that the invention may be more readily understood and put into practical effect, reference will now be made to the accompanying drawings which illustrate a preferred embodiment of the invention and wherein.

DETAILED DESCRIPTION OF THE PREFERRED EMBODIMENT

Figure 1:
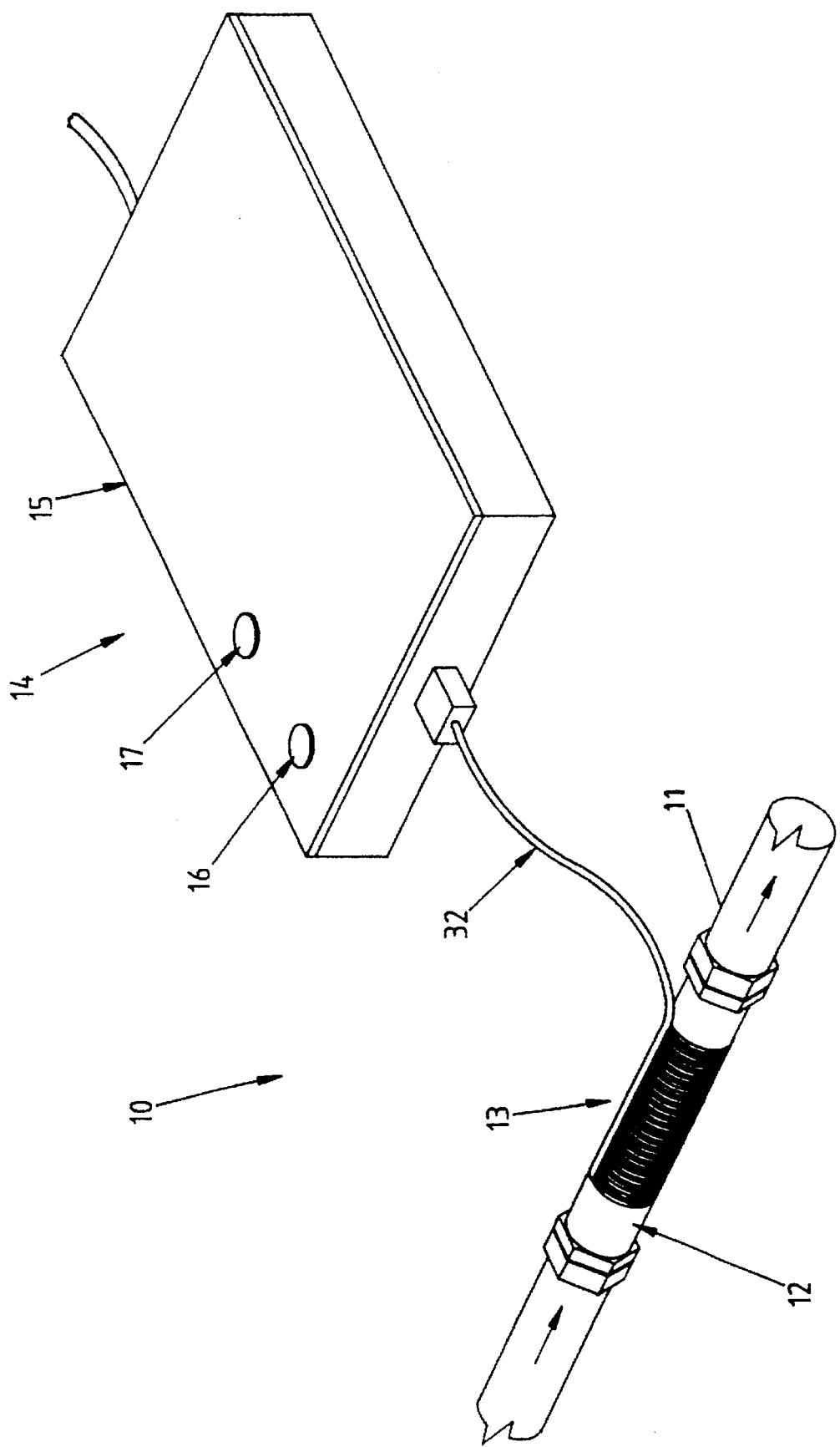
FIG. 1 illustrates the general nature of the apparatus according to the present invention.
Figure 2:
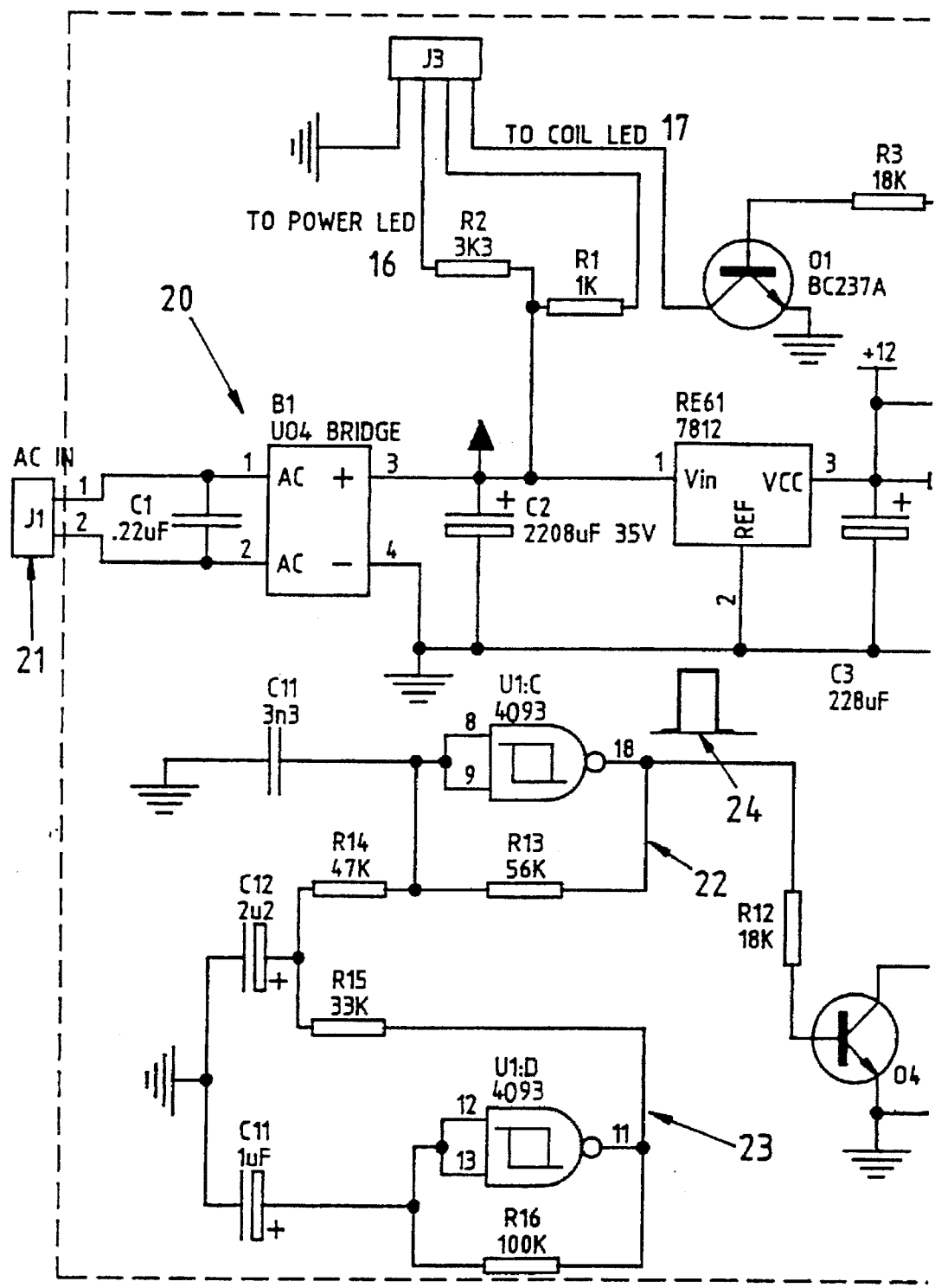
FIGS. 2 and 2A illustrate a circuit diagram of the circuit for generating and applying a signal to a fluid flow line.
Figure 2A:
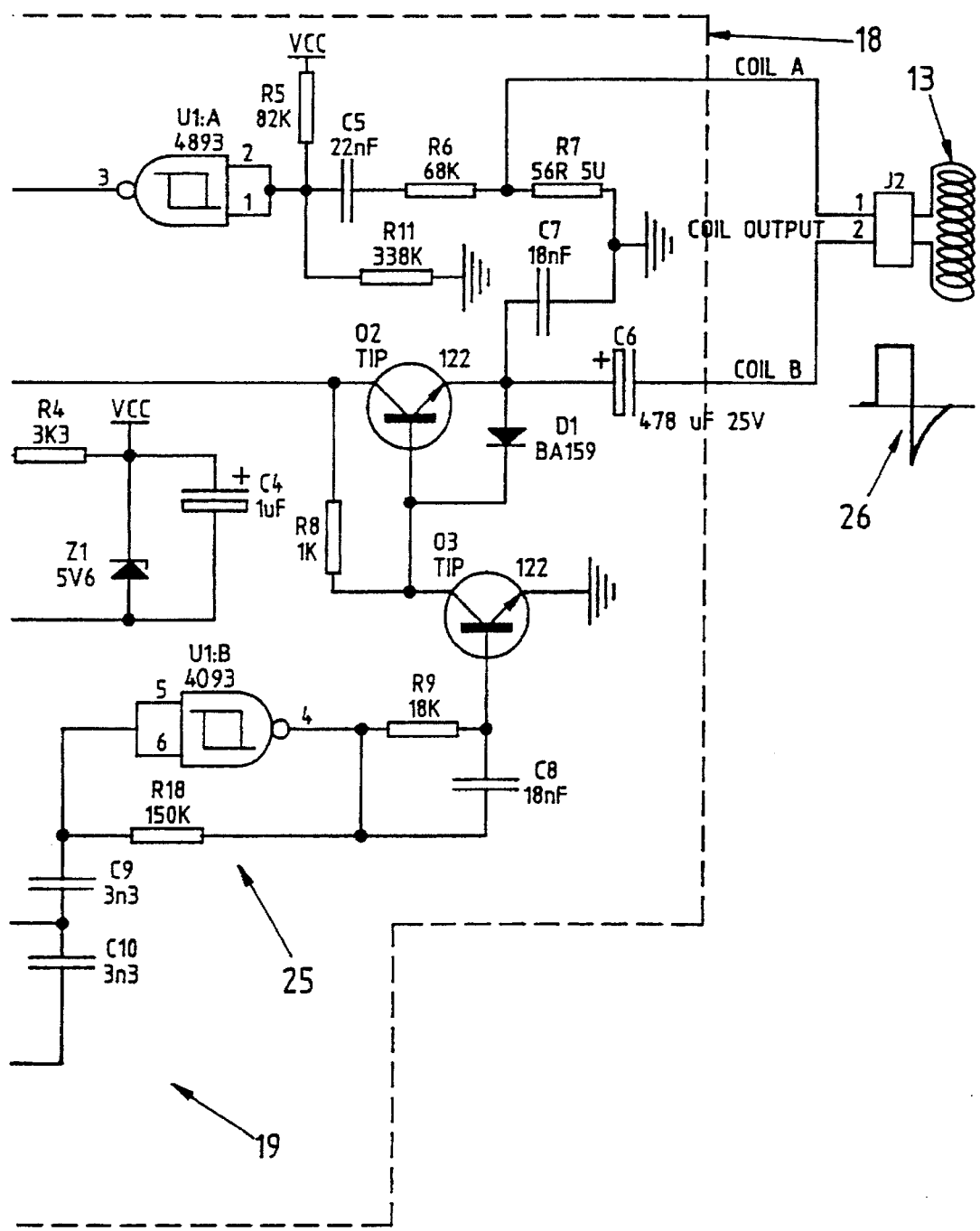

Referring firstly to FIG. 1 there is illustrated apparatus 10 according to the present invention for application to ducts or pipes 11 through which a beer or other related alcoholic beverage is flowing. The apparatus 10 includes a former 12 formed of a non-magnetic non-ferrous material such as a plastics material and preferably a polyvinyl chloride (PVC). Wound about the former 12 are a plurality of turns of wire forming a coil 13 which is connected to receive a signal from a signal generator 14.

The former 12 is preferably 20 mm in diameter having wound thereon four layers of 0.315 mm insulated copper wire extending 100–150 mm along the former 12. The former 12 may be provided with an outer casing to surround the windings or the layers of wire may be provided with a shrink sleeving. Preferably, each end of the former 12 is provided with a threaded retaining clamp assembly to enable the former 12 to be clamped in a fixed position to the pipe or duct 11.

The coil 13 is adapted to be connected to a signal generator 14 is housed within a casing 15 provided with an indicator 16 in the form of a light emitting diode (LED) which indicates circuit operation and a further indicator 17 in the form of a light emitting diode (LED) which indicates power supply to the apparatus 10. Mounted within the casing 15 is a circuit board 18 which carries the components of the signal generating circuit 19 and associated power supply 20.

The power supply 20 includes a bridge rectifier B1 and capacitor C1 which are arranged to be connected to an AC supply 21 to provide a pulsating DC voltage at the output of the rectifier B1 at a frequency in this embodiment of 100 Hz which is then applied to a capacitor C2 which filters and smooths to supply a DC voltage. This smoothed DC voltage is then applied to a regulator Reg1 which outputs a fixed DC voltage in this instance 12 volts which in conjunction with capacitor C3 provides a regulated 12 volt supply. Resistor R2 applies the voltage output from the bridge B1 to the externally mounted LED 16 which indicates that power is supplied to the circuit. The resistor R2 limits the current flowing to the LED 16.

The resistor R4, Zener diode Z1 and capacitor C4 form a further power supply (VCC), preferably a 5 volts DC supply, to be applied to the signal generator circuit 19. Alternatively, a further regulator may be used to supply a regulated output for supply to the circuit 19.

The signal generating circuit 19 is primarily formed about a quad nand gate Schmitt trigger which in this embodiment comprises a type 4093 CMOS Integrated Circuit U1 which has four separate gates designated U1:A, U1:B, U1:C and U1:D. The gates U1:B, U1:C, and U1:D are used as oscillators as described below.

The gate U1:C forms an oscillator 22 with resistor R13 and capacitor C11 whose normal frequency of oscillation as determined by resistor R13 and capacitor C11 is 10 Hz. The gate U1:D is configured as an oscillator 23 with resistor R16 and capacitor C13 which set the normal frequency of oscillation at 7 KHZ. Both oscillators 22 and 23 provide a positive going square wave output. The output of the oscillator 23 is connected to the input of the oscillator 22 through resistors R13 and R14 and capacitor C12 which is charged and discharged by the output of the oscillator 23 to apply a modulating signal to the input of the oscillator 22. The output of the oscillator 22 is thus a modulated positive going square wave of the form illustrated schematically at 24 where frequency varies as determined by the output of the oscillator 23. The average frequency of this output signal is 3.8 KHz.

This output signal is applied to via resistor R12 to the base of a transistor Q4 and the varying frequency of the signal 24 serves to switch transistor Q4 on and off at the varying frequency. The purpose of R12 is to limit the current to the base of transistor Q4.

The gate U1:B is connected with resistor R10 and capacitors C9 and C10 to form a further oscillator 25 whose output is normally a positive going square wave. As with the oscillators 22 and 23, the frequency of this oscillator is controlled by the values of its associated resistor and capacitor in this case resistor R10 and capacitors C9 and C10. The oscillator 25 would normally run at a frequency of 2.6 KHz. The capacitors C9 and C10 are connected in series and are of the same value so that the capacitance of the series capacitors C9 and C10 is half the total capacitance of the capacitors. This oscillator 25 is modulated by the output signal 24 of the of the oscillator 22 applied through the transistor Q4. The capacitors C9 and C10 are connected to the collector of the transistor Q4 which when switched on and off the shunts the capacitor C9 to ground at a frequencies determined by the variable frequencies of the output signal 24. The effect of this switching is to double the capacitance of the series capacitors C9 and C10 every time the transistor Q4 is switched on. This therefore halves the output frequency at output of the oscillator 25.

The output of the oscillator 25 is connected via an R-C circuit formed by resistor R9 and capacitor C8 to a Darlington pair of transistors Q3 and Q2 which amplify the signal and apply the amplified signal to the positive plate of a capacitor C6. The capacitor C6 isolates DC voltages at the more negative plate and applies the signal to the coil 13 via a connector J2. When the coil 13 is connected, the signal passes through the coil 13 and returns to ground via resistor R7. The signal applied to the coil 13 as indicated at 26 comprises a positive going square wave and a negative spike which returns through an exponential curve to zero.

The fourth gate U1:A of the integrated circuit U1, is used as a detector to show that the coil 13 is operating. Resistors R5 and R11 form a voltage divider connected to the voltage VCC and applying an input to the gate U1:A. The input of the gate U1:A is also connected via capacitor C5 and resistor R6 to the coil 13. When the coil 13 is not connected or operating the voltage applied by the voltage divider R5 and R11 to the input of the gate U1:A causes the output of the gate U1:A to be low. When the coil 13 is operating, the input voltage to the gate U1:A is lowered by capacitor C5 AC coupling this voltage to R6. When the input voltage goes below the trip point of the schmitt trigger U1:A, the output of the gate U1:A goes high thus supplying a voltage to resistor R3 which is connected to the base of transistor Q1 and serves to limit the current to the transistor Q1. When this current limited voltage is applied to the transistor Q1, the external LED 17 is grounded through the transistor Q1 and current limiting resistor R1 and thus is illuminated when the coil 13 is connected and operating. Thus LED 17 serves as a coil operating indicator.

When the coil 13 is removed or not operating the transistor Q1 is switched off due to an absence of base current and the LED 17 goes out. Both LED 16 and LED 17 are preferably connected externally through connector J3.

The output applied to the coil connector or jack J2 comprises a jumble or range of frequencies generated by the gates U1:C and U1:D. As stated above both U1:C and U1:D are connected as separate oscillators with the output of U1:D being applied to the input of U1:C. The oscillator 22 including gate U1:C provides a substantially lower frequency than the oscillator circuit 23 which includes gate U1:D. Thus if disconnected from each other, the oscillator 22 of U1:C will provide a frequency of approximately 10 Hz and that of U1:D approximately 7 KHz. The combined circuit generates a sweep of frequencies usually in the range of 1 KHz to 7 KHz.

It is however within the scope of the present invention to provide an oscillator circuit which provides a single frequency output or a range of frequencies beyond the above range for application to the coil. Appropriate frequency selection is made in accordance with the nature of the fluid flowing in the pipe or duct and the nature of cleansing required.

Figure 3:
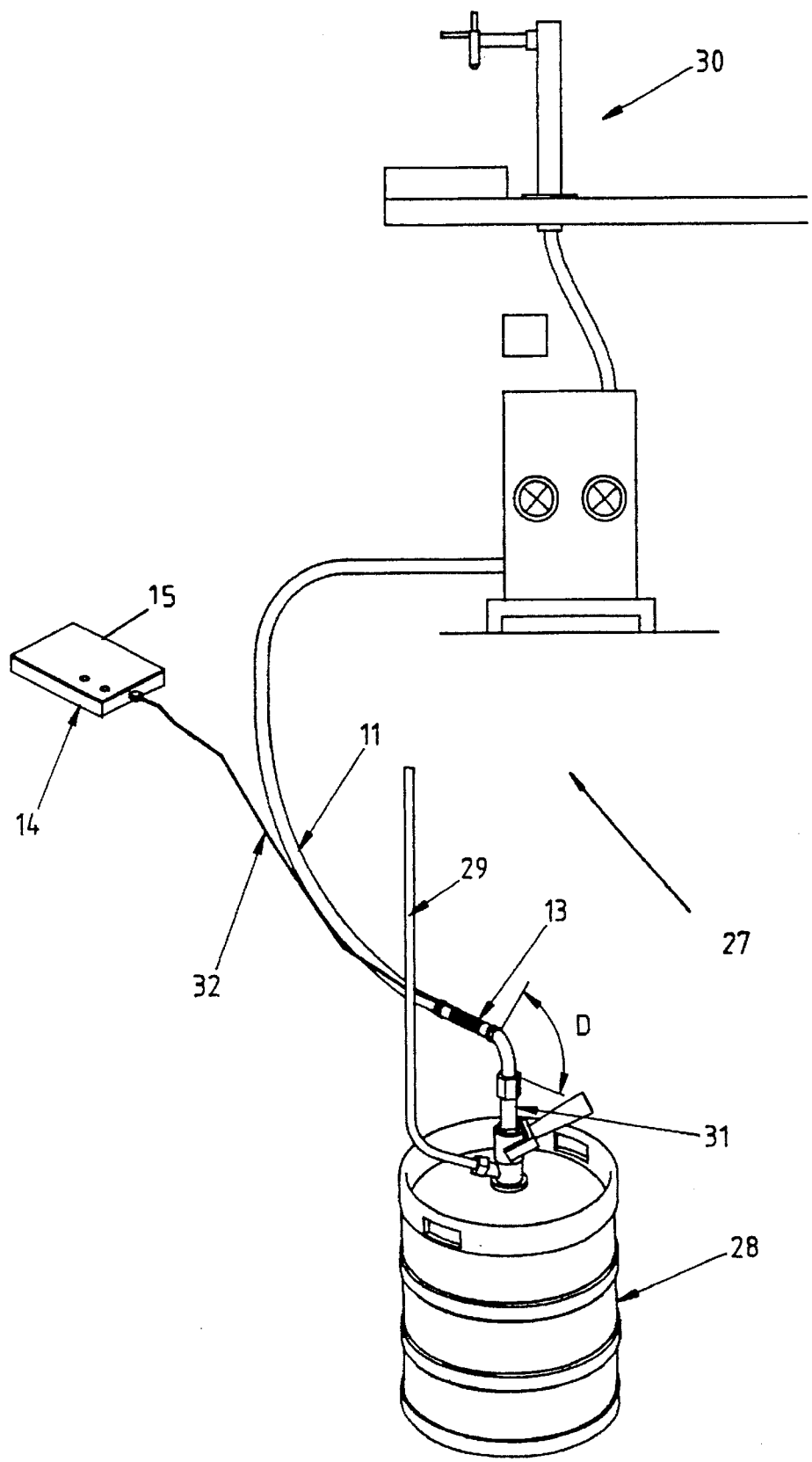
FIG. 3 illustrates the application of the apparatus of the invention to an installation supplying beer from a keg.

In use and as shown in FIG. 3, the apparatus of the invention may be suitably applied to an installation 27 including a keg 28 pressurised through a line 29 and supplying beer through a duct or pipe 11 to a dispenser 30 located say in a bar area, the duct or pipe 11 being connected to the keg 28 through an adaptor 31. The former 12 carrying the coil 13 is located about the pipe 12 and suitably the coil/former assembly is located no greater than a distance D from the adaptor, the distance D being approximately 10 cm. The signal generator 14 housed in the housing 15 is mounted in any suitable location and connected to the coil 13 through the wires 32.

When applied to new beer lines, a cleaning cycle of 10 weeks is suitably employed. After installation, the apparatus is left operating for 24 hours a day for the full 10 weeks. At the end of the 10 week cycle, the beer line 12 is chemically cleaned including the dismantling and cleaning of all keg adaptors, beer taps and other ancillary equipment associated with the beer line reticulation system. After chemical cleaning and reassembly, the apparatus 10 of the invention is again operated for a further 10 week cycle. It will be found that a substantial reduction in contaminant build up occurs on the walls of the beer line 12 during operation of the apparatus of the invention.

For cleaning old beer lines 12, the apparatus 10 is preferably used in three initial cleaning cycles of 4 weeks duration each due to the presence of "beer scale" in old beer lines. The initial cleaning cycles may be required to be extended however in very contaminated lines. After the end of the initial four week cycle, the beer line is chemically cleaned. This will cause removal of the existing "beer scale" displaced by the effect of the apparatus of the invention. Once chemically cleaned and flushed out with water, the procedure is repeated for a further four week period. This procedure is continued in four week cycles until flushing indicates that the beer line is free of "beer scale" and that no white or brown residues remain.

The incorporation of the apparatus of the invention in beer lines will result in a substantial cost saving compared to the current chemical cleaning method. The cost saving is the direct result of less beer wastage, less chemical usage and reduced manpower that is normally expended during current cleaning procedures.

Whilst the apparatus is primarily intended to prevent build up of contaminants in beer lines, it is also effective it removing built up contaminants in beer lines.

The above has been given by way of illustrative embodiment of the invention, all such modifications and variations thereto as would be apparent to persons skilled in the art are deemed to fall within the broad scope and ambit of the invention as defined in the claims.

We claim:

1. A method for preventing or removing contaminant build-up in a beer supply line between beer storage means and beer dispensing means, said method including the steps of locating electromagnetic field generating means adjacent a section of said beer supply line, applying a frequency modulated square wave voltage signal to said electromagnetic field generating means to generate a varying frequency electromagnetic field in said section of said supply line, and subjecting said line to said electromagnetic field for an extended period of time to inhibit or remove contaminant cell growth in said beer supply line.

2. A method according to claim 1 wherein said signal applied to said coil has a frequency varying between 1 KHz and 7 KHz.

3. A method according to claim 2 wherein said signal has an average frequency in the range of 1.2 KHz to 2.6 KHz.

4. Apparatus for preventing or removing contaminant build-up in a beer supply line between beer storage means and beer dispensing means, said apparatus including a coil adapted to be disposed about a section of said line, signal generating means for generating a frequency modulated square wave voltage signal, and means for applying said signal to said coil to create an electromagnetic field within said line, said electromagnetic field inhibiting or removing contaminant cell growth within said beer supply line.

5. Apparatus according to claim 4 wherein said signal generating means generates signals for application to said coil having frequencies varying between 1 KHz and 7 KHZ.

6. Apparatus according to claim 5 wherein the average frequency of said signal is between 1.2 KHz and 2.6 KHz.

7. Apparatus according to claim 4 wherein said signal applied to said coil is in the form of a positive going square wave followed by a negative going spike.

8. Apparatus according to claim 4 wherein said coil is wound upon a former to form a coil assembly located coaxially about said pipe, duct or line.

9. Apparatus according to claim 8 wherein said line is connected to said beer storage means through an adaptor and wherein said coil assembly is located adjacent said adaptor.

10. Apparatus according to claim 9 wherein said coil assembly is located no greater than 10 cm from said adaptor.

11. Apparatus according to claim 4 wherein said signal generating means comprises first and second square wave oscillators, and wherein the output of said second oscillator is modulated in frequency by the output of said first oscillator.

12. Apparatus according to claim 11 wherein said signal generating means includes a third square wave oscillator, and wherein the output of said second oscillator modulates in frequency the output of said third square wave oscillator.

13. Apparatus according to claim 12 and including amplifier means for amplifying the output of said third square wave oscillator.

14. Apparatus according to claim 13 wherein the output of said amplifier means is adapted to be connected to said coil via capacitance means.

15. Apparatus according to claim 4 and including indicator means for indicating operation of said coil.

16. Apparatus for preventing or removing contaminant build-up in a beer supply line between a beer storage keg and beer dispensing means, said apparatus including a coil adapted to be disposed about a section of said line, first square wave oscillator means having a first set frequency and an input and an output, second square wave oscillator means having a second set frequency and an input and output, said second set frequency being higher than said first set frequency, the output of said second oscillator means being connected to the input of said first oscillator means whereby the output of said second oscillator means modulates in frequency the output of said first oscillator means, switch means connected to the output of said first oscillator means, said switch means being switched on and off by the modulated output of said first oscillator means, third square wave oscillator means having a set frequency between said first and second set frequencies, said third square wave oscillator means having an input and an output, the input of said third square wave oscillator means being connected to said switch means whereby said switching on and off of said switch means modulates the output of said third square wave oscillator means, and means connecting the output of said third square wave oscillator means to said coil whereby to create a varying frequency electromagnetic field within said line, said electromagnetic field inhibiting or removing contaminant cell growth within said beer supply line.

17. Apparatus according to claim 16 wherein said beer storage means comprises a beer keg and wherein said coil is wound upon a former located coaxially about said beer supply line adjacent to said keg.

18. A beer supply system including beer storage means and beer dispensing means and a supply line for supplying beer from said beer storage means to said beer dispensing means, said system including apparatus for preventing or removing contaminant build-up in said supply line, said apparatus including a coil disposed about a section of said line, signal generating means for generating a frequency modulated square wave voltage signal, said signal varying in frequency between 1 KHz and 7 KHz, and means for applying said signal to said coil to create an electromagnetic field within said line, said electromagnetic field inhibiting or removing contaminant cell growth within said beer supply line.

* * * * *